(12) United States Patent
Garcia Garcia et al.

(10) Patent No.: US 8,191,670 B2
(45) Date of Patent: Jun. 5, 2012

(54) CRASH SUPPORT IN THE TUNNEL REGION OF A MOTOR VEHICLE

(75) Inventors: Marcos Garcia Garcia, Stuttgart (DE); Jürgen Metzler, Gaggenau (DE); Claus-Dieter Unfried, Markgröningen (DE); Jan Hogenmüller, Leonberg (DE); Roland-Gerhard Stromsky, Freiberg (DE)

(73) Assignee: Dr. Ing h.c.F. Porsche Aktiengesellschaft, Stuttgart (DE)

( * ) Notice: Subject to any disclaimer, the term of this patent is extended or adjusted under 35 U.S.C. 154(b) by 502 days.

(21) Appl. No.: 11/874,227

(22) Filed: Oct. 18, 2007

(65) Prior Publication Data
US 2008/0093893 A1   Apr. 24, 2008

(30) Foreign Application Priority Data
Oct. 18, 2006   (DE) .................. 10 2006 049 244

(51) Int. Cl.
*B60K 13/04*   (2006.01)
(52) U.S. Cl. ........................ 180/309; 180/296
(58) Field of Classification Search .................. 180/296, 180/297, 89.2, 308, 309
See application file for complete search history.

(56) References Cited

U.S. PATENT DOCUMENTS

| | | | | |
|---|---|---|---|---|
| 3,204,901 A | * | 9/1965 | Dunu .......................... | 248/74.3 |
| 4,073,361 A | * | 2/1978 | Murota et al. .............. | 181/228 |
| 4,077,382 A | * | 3/1978 | Gentile ....................... | 123/190.2 |
| 4,536,371 A | * | 8/1985 | Thayer et al. ............... | 422/171 |
| 5,195,607 A | * | 3/1993 | Shimada et al. ............ | 180/296 |
| 6,209,914 B1 | * | 4/2001 | Grieser et al. .............. | 280/795 |
| 6,382,710 B1 | * | 5/2002 | Funk et al. ................. | 296/187.12 |
| 7,600,807 B2 | * | 10/2009 | Bachmann .................. | 296/187.08 |
| 2001/0026083 A1 | * | 10/2001 | Averdiek et al. ............ | 296/204 |
| 2001/0047897 A1 | | 12/2001 | Steenackers et al. | |
| 2002/0195842 A1 | | 12/2002 | Kruschhausen et al. | |
| 2008/0251306 A1 | * | 10/2008 | Kobayashi et al. ......... | 180/89.2 |

FOREIGN PATENT DOCUMENTS

| | | |
|---|---|---|
| DE | 10260393 B4 | 1/2004 |
| DE | 102004044018 A1 | 3/2006 |
| EP | 1104839 A1 | 6/2001 |
| EP | 1270382 A2 | 1/2003 |
| FR | 2824040 B1 | 10/2002 |
| JP | 2004058845 A | 2/2004 |
| JP | 2006-151146 * | 6/2006 |
| JP | 2008137589 * | 6/2008 |

* cited by examiner

*Primary Examiner* — J. Allen Shriver, II
*Assistant Examiner* — Bridget Avery

(57) ABSTRACT

A crash support assembly is provided in the tunnel region of a motor vehicle. The motor vehicle has at least one exhaust tract guided through a tunnel of the vehicle and seat cross members are disposed to the side of the tunnel. A crash support is held on the exhaust tract and is disposed such that it swings freely between the seat cross members. A crash support of this type permits the vehicle to be optimized with regard to the conditions of a pole crash with a low outlay on production and assembly.

20 Claims, 4 Drawing Sheets

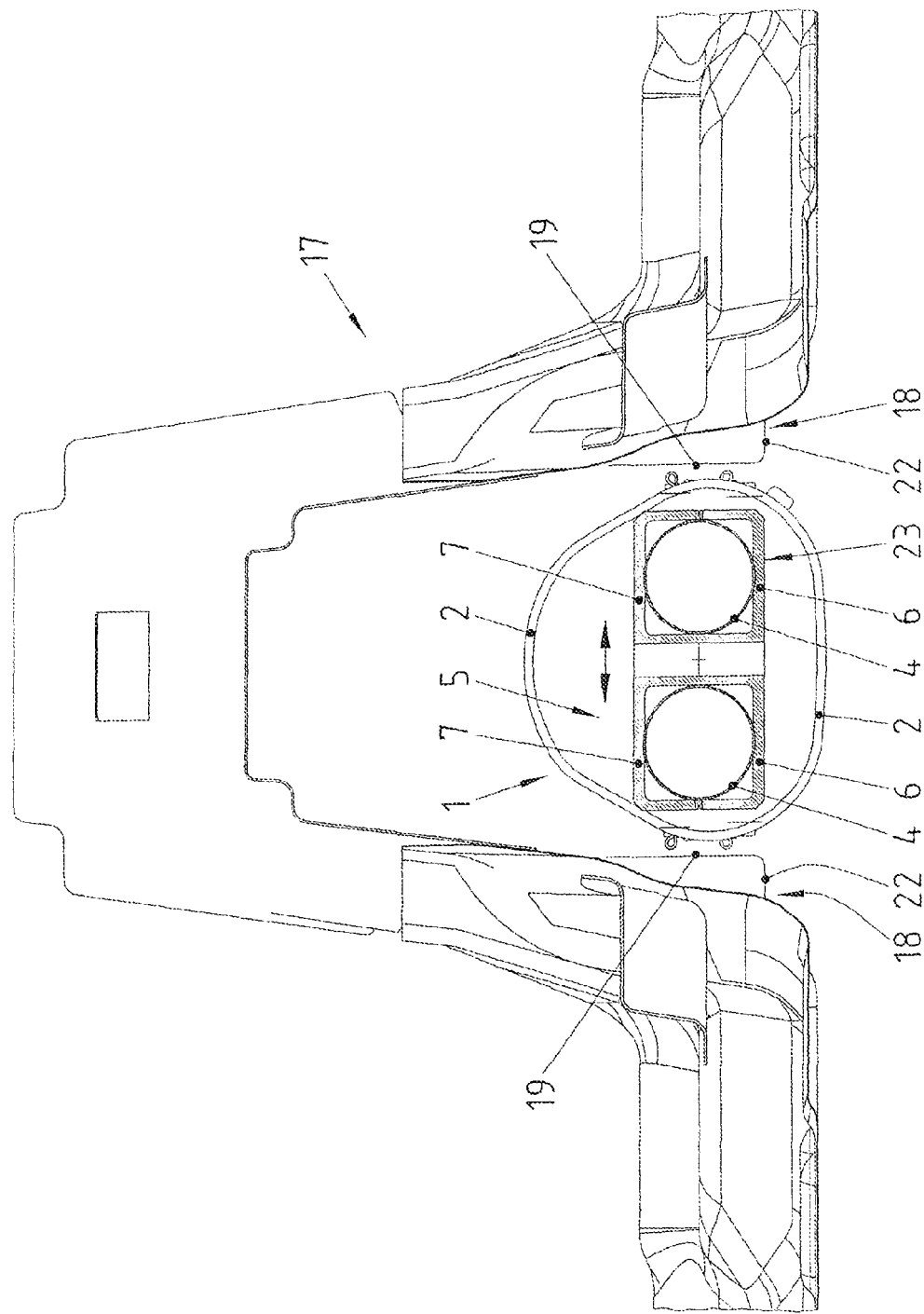

CRASH SUPPORT IN THE TUNNEL REGION OF A MOTOR VEHICLE

CROSS-REFERENCE TO RELATED APPLICATION

This application claims the priority, under 35 U.S.C. §119, of German application DE 10 2006 049 244.7, filed Oct. 18, 2006; the prior application is herewith incorporated by reference in its entirety.

BACKGROUND OF THE INVENTION

Field of the Invention

The invention relates to a crash support in the tunnel region of a motor vehicle, at least one exhaust tract is guided through the tunnel of the vehicle and seat cross members are disposed to the side of the tunnel.

A crash support of this type is known from German patent DE 102 60 393 B4. In this, the tunnel structure of the motor vehicle directly forms the crash support. The tunnel structure has a central basic body which is manufactured as a cast part and for the reinforcement of which main ribs running transversely with respect to the longitudinal axis of the vehicle are provided. The main ribs are disposed and dimensioned in such a manner that forces from a lateral impact can be reliably dissipated. Seat cross members are directly connected to the basic body as add-on parts, and therefore, in the event of a lateral crash, the forces occurring during it are introduced into the basic body of the tunnel structure via the seat cross member.

Such a configuration of the tunnel structure with a specially manufactured basic body is complicated structurally and, moreover, cost-intensive. In addition, the weight of the basic body is increased by the additionally fitted ribs.

Different types of crash tests are used in practice. In the case of a lateral crash test, the test vehicle is stationary on the ground. A movable, deformable aluminum or plastic block is moved at right angles to the vehicle onto the driver's side of the vehicle. It strikes the vehicle at the driver's door, the B pillar and the rear door of the driver's side.

In the case of a pole crash test, the test vehicle is stationary on the ground. A pole-like object is rammed into the driver's door. This crash test demonstrates the stability of the side structure and roof structure. In reality, this type of accident would correspond to "wrapping around a lamppost".

A device for reinforcing a motor vehicle tunnel is known from Published, French patent application FR 2 824 040 A. The device is configured as a hollow body, the outer cross section of which is matched to the inner cross section of the tunnel, and therefore the device makes contact with the tunnel. That side of the device which faces away from the tunnel is of a profiled configuration and therefore of a stiffened configuration and serves for the mounting of a plurality of pipes or cables guided in the longitudinal direction of the device. The device can be closed by a cover. The cover is also of a profiled configuration in order to receive the pipes or cables. The device with the cover extends only over part of the length of the tunnel.

BRIEF SUMMARY OF THE INVENTION

It is accordingly an object of the invention to provide a crash support in the tunnel region of a motor vehicle which overcomes the above-mentioned disadvantages of the prior art devices of this general type, which crash support optimizes the vehicle with regard to the conditions of the pole crash with little outlay on production and assembly.

With the foregoing and other objects in view there is provided, in accordance with the invention, a crash support assembly for a motor vehicle. The motor vehicle has a tunnel region, at least one exhaust tract guided through the tunnel region, and seat cross members disposed on sides of the tunnel region. The crash support assembly contains a crash support disposed on the exhaust tract and disposed to swing freely between the seat cross members.

The object is achieved in the case of a crash support of the type mentioned at the beginning in that the crash support is held on the exhaust tract and is disposed such that it swings freely between the seat cross members.

The crash support therefore constitutes a spacer part in the interior of the tunnel between the seat cross members. In the non-crash situation, the crash support is disposed at a distance from the seat cross members and therefore, since it is held on the exhaust tract, can swing freely together with the latter. The possibility of the exhaust tract swinging freely arises on the basis of the exhaust tract being mounted in the tunnel region of the vehicle; the exhaust tract swings freely in the region between the seat cross members. In the event of a crash with introduction of lateral forces, in particular a pole crash test, the structure of the seat cross member which is subjected to the crash force cannot be deformed freely in the direction of the other seat cross member and therefore be deformed to a considerable extent, rather, the seat cross member makes contact with the crash support which is then supported on the other seat cross member. As a consequence of this, the crash support can no longer swing freely. A frictional connection is therefore produced between the seat cross member, which is subjected directly to the crash force, the crash support and the other seat cross member. The crash support and the other seat cross member therefore contribute to the dimensional stability of the vehicle during the crash.

The crash support is therefore fitted at a distance from the two seat cross members. The seat cross members only come into contact with the crash support in the event of a crash. The distance which exists between the crash support and the respective seat cross member is to be selected in accordance with the requirements which are determined, for example, by the assembly conditions in the region of the tunnel, the dynamics of the components disposed there, etc. The respective seat cross member is preferably disposed at a small distance from the crash support.

A connection between the crash support and the exhaust tract can be achieved in a particularly simple manner if the crash support has two half shells which accommodate the exhaust tract between them. In the simplest configuration, it is then only necessary to connect the two half shells to each other. The term half shell is to be understood comprehensively to the effect that the exhaust tract is held between two parts. The respective half shell is configured in accordance with the configuration of the exhaust tract. If the exhaust tract has, for example, one exhaust pipe, the half shell expediently has an opening, which is semicircular in cross section, in order to accommodate the exhaust pipe. However, if parts of the exhaust tract form two exhaust pipes which are guided adjacent and parallel to each other, the respective half shell advantageously has two receptacles, which are disposed next to each other and are semicircular in cross section, for the exhaust pipes.

In particular if the crash support is configured with two half shells for accommodating two exhaust pipes, it is considered advantageous if the dividing plane of the crash support, which dividing plane is predetermined by the half shells, is disposed parallel to the vehicle floor. This makes it possible to attach the crash support only when the exhaust tract has already been fitted.

From the point of view of minimizing the production costs, it is considered particularly advantageous if the half shells are of identical configuration. They are, in particular, cast metal parts which are provided with holes for receiving screws to connect the half shells. A certain modification of the half shells arises if one half shell only has the hole and the other half shell has a threaded hole, and therefore the screws for connecting the half shells can be screwed directly into one half shell. It is likewise conceivable to provide both half shells only with holes. In this case, the connecting screws would have to be screwed into nuts. An identical configuration of the half shells makes it possible to use the half shells on the reverse, if appropriate until the final machining of the threaded hole; only one blank is therefore required.

The required form-fitting connection of the half shells to each other can be ensured in a simple manner by using one or more mating elements which are configured, in particular, as mating sleeves. For this purpose, the half shells have, on the mutually facing sides, recesses for receiving at least one, in particular two mating elements, the respective mating element engaging in a recess of one half shell and in the recess, which is adjacent to the recess, of the other half shell. If the respective mating element is configured as a mating sleeve, the screw for connecting the two half shells can be inserted directly through the mating sleeve, and therefore no additional holes are required in the half shells for the screws.

The described configuration of the crash support with two half shells which can be connected to each other by a screw connection makes it possible to achieve a screw connection of the half shells, the screw connection being compressed to its full extent and therefore being a unit which is clamped on the exhaust tract. This open construction permits the crash support to be used individually. It can therefore be connected to the exhaust tract at any desired point and interacts with the components, which are adjacent laterally to it, in the event of a crash, in particular in the event of a pole crash.

Other features which are considered as characteristic for the invention are set forth in the appended claims.

Although the invention is illustrated and described herein as embodied in a crash support in the tunnel region of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 4 is a diagrammatic, sectional view through a tunnel of a passenger vehicle with a crash support connected to the exhaust tract, the section being sectioned through the crash support and being seen in a direction of the arrow A shown in FIG. 1.

DETAILED DESCRIPTION OF THE INVENTION

Figure 1:
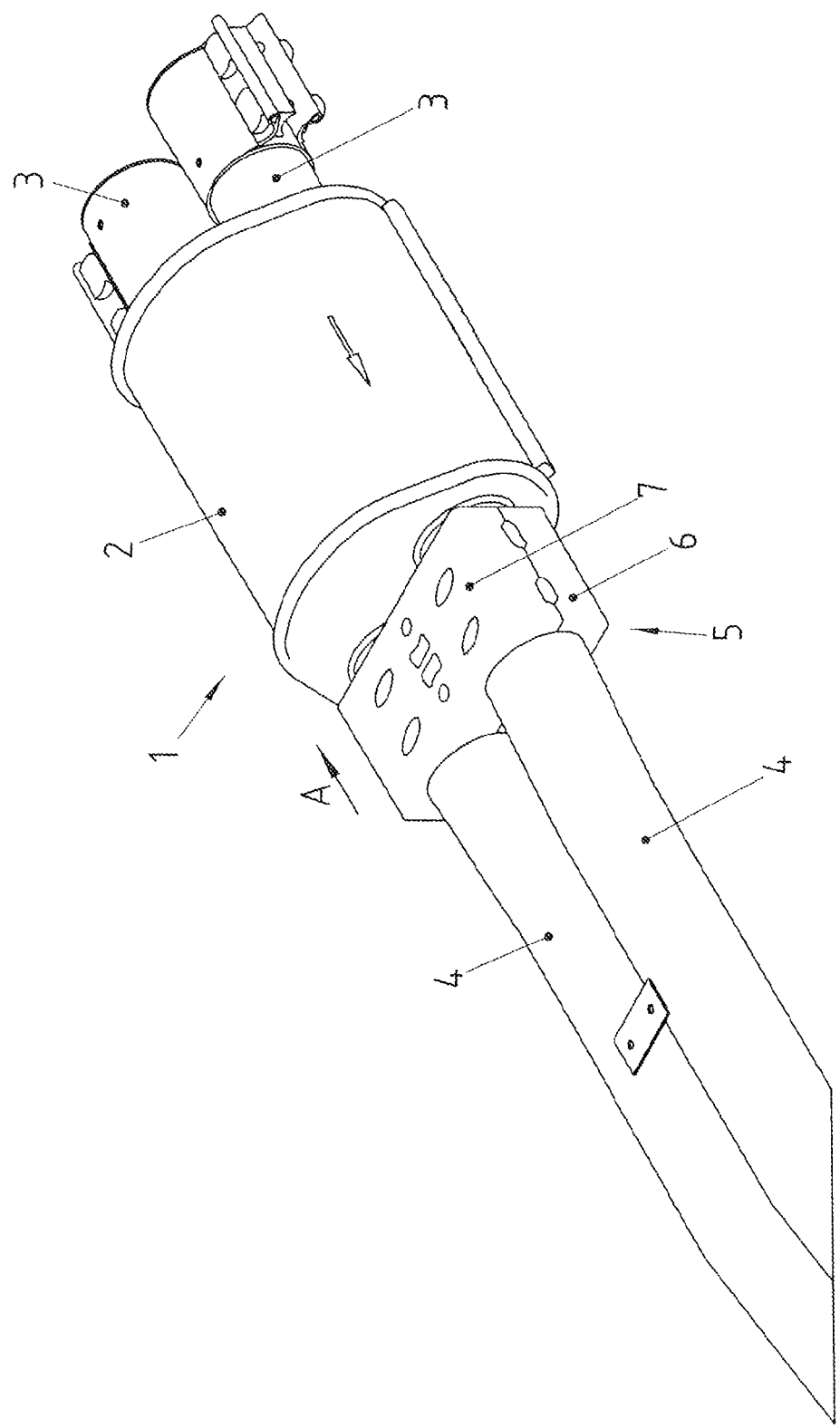
FIG. 1 is a diagrammatic, three-dimensional view of an exhaust tract with a crash support connected to two exhaust pipes of the exhaust tract according to the invention.

Referring now to the figures of the drawing in detail and first, particularly, to FIG. 1 thereof, there is shown an exhaust tract 1 of a passenger vehicle. The exhaust tract 1 has a front muffler 2, two exhaust pipes 3 leading thereto and two exhaust pipes 4 leading away therefrom. A crash support 5 is connected to the two exhaust pipes 4 adjacent to the front muffler 2.

Figure 3:
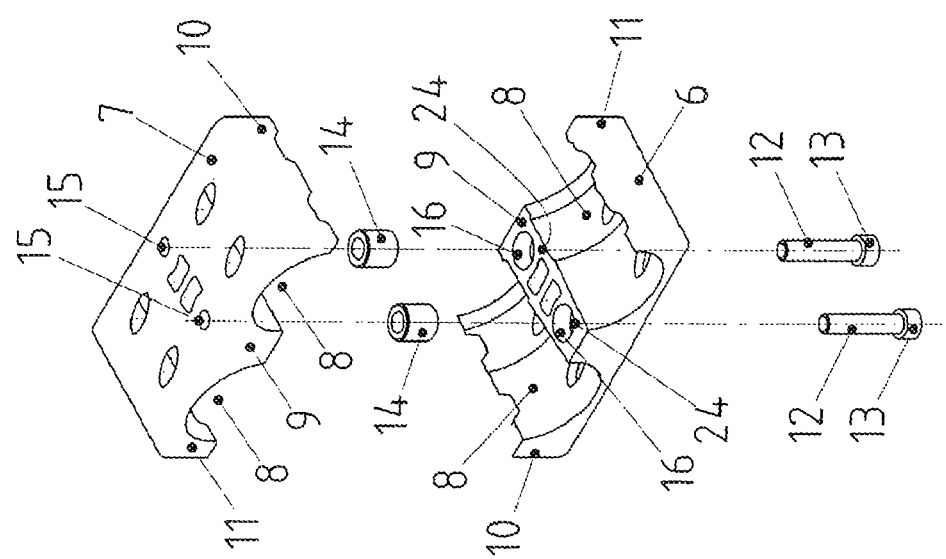
FIG. 3 is a diagrammatic, exploded three-dimensional view the crash support.
Figure 2:
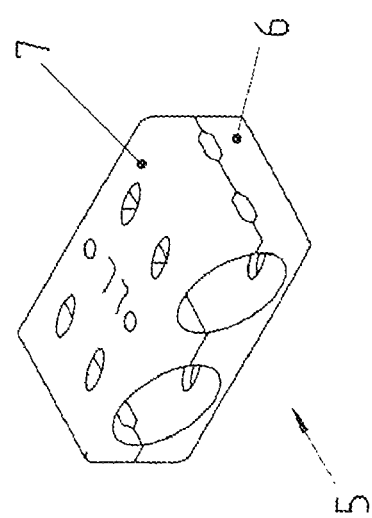
FIG. 2 is a diagrammatic, three-dimensional view of the crash support.

As can be seen in particular from the illustration of FIGS. 2 and 3, the crash support 5 has two half shells which are referred to as lower half shell 6 and upper half shell 7. The half shells 6 and 7 are of identical configuration with respect to the casting blank and have two generally semicircular recesses 8 for receiving the exhaust pipes 4. A bearing web 9 is formed between the two recesses 8 of the respective half shells 6 and 7 and, furthermore, bearing webs 10 and 11 are formed on those sides of the respective half shells 6 and 7 which face away from the bearing web 9. Owing to this configuration, the two half shells 6 and 7 can be used on the reverse, and therefore, in the case of the configuration of the one half shell 6, are upwardly open and, in the case of the configuration of the other half shell 7, are downwardly open.

The lower half shell 6 has two passage holes 24 for receiving two screws 12 inserted from below. Screw heads 13 of the screws are recessed in the half shell 6. That region of the bearing web 9 which faces away from the respective screw head 13 is provided with a hole 16 of larger diameter for receiving a mating sleeve 14. The two screws 12 pass through mating sleeves 14. The half shell 7 is also provided in the region of its bearing web 9 with two passage holes, with a stepped diameter, the holes with the larger diameter serving to receive the mating sleeves 14. The hole section with the smaller diameter is configured as a threaded hole 15. When the crash support 5 is fitted, the two screws 12 therefore pass through the half shells 6 and 7 and the two mating sleeves 14 and are screwed into the threaded holes 15 of the half shell 7. The mating sleeves 14 bring about a radial form-fitting connection between the two half shells 6 and 7, and therefore the latter cannot be displaced with respect to each other in the dividing plane of the two half shells 6 and 7.

FIG. 1 shows the crash support 5 which is connected to the two exhaust pipes 4. The dimensions of the half shells 6 and 7 are of such a size that the exhaust pipes 4 are clamped between the two half shells 6 and 7, and the half shells 6 and 7 just make contact with each other in the region of the respective bearing webs 9, 10 and 11 or are disposed at a slight distance from each other.

FIG. 4 shows a tunnel 17 of the passenger vehicle with seat cross members 18 disposed to a side of the tunnel 17. The exhaust tract 1 is guided through the tunnel 17. The front muffler 2 and the exhaust pipes 4 are shown in FIG. 4. The crash support 5 is clamped to the exhaust pipes 4. The crash support is illustrated in simplified form in comparison to the embodiment according to FIGS. 1 to 3, in particular without its screw connection and the mating sleeves. It is shown that the crash support 5 is disposed at a distance from a supporting surface 19 of the respective seat cross member 18, to be precise, that surface of the crash support 5 which faces the supporting surface 19 is disposed parallel thereto. With reference to a longitudinal axis of the tunnel 17, the seat cross members 18 are disposed symmetrically with respect to each other. Accordingly, on account of the freely swinging mounting of the exhaust pipes 4, the crash support 5 can likewise swing freely together therewith between the two seat cross members 18.

A lower contour 23 of the crash support 5, specifically the lower contour 23 of the lower half shell 6, is disposed approximately level with a lower contour 22 of the seat cross member 18. This ensures that, with reference to the direction of force in the event of a crash, the seat cross member 18 completely covers the crash support 5.

In the event of a crash, in particular a pole crash, the action of the crash force causes deformation of that region of the vehicle which faces the object having the effect and therefore also the seat cross member 18 which is located in this region and which consequently comes with its supporting surface 19 against the crash support 5. Depending on the level of the crash force in effect, the exhaust tract 1 which is provided with the crash support 5 deforms to the side, if appropriate until the crash support 5 comes into contact with the supporting surface 19 of the other seat cross member 18. The seat cross member 18 which faces the crash event is therefore supported via the crash support 5 on the seat cross member 18 which faces away from the crash event. The direction of support of the crash support 5 is shown in FIG. 4 by the double arrow, depending on whether the crash force is introduced into the crash support via the one seat cross member 18 or via the other seat cross member 18.

Figure 5:
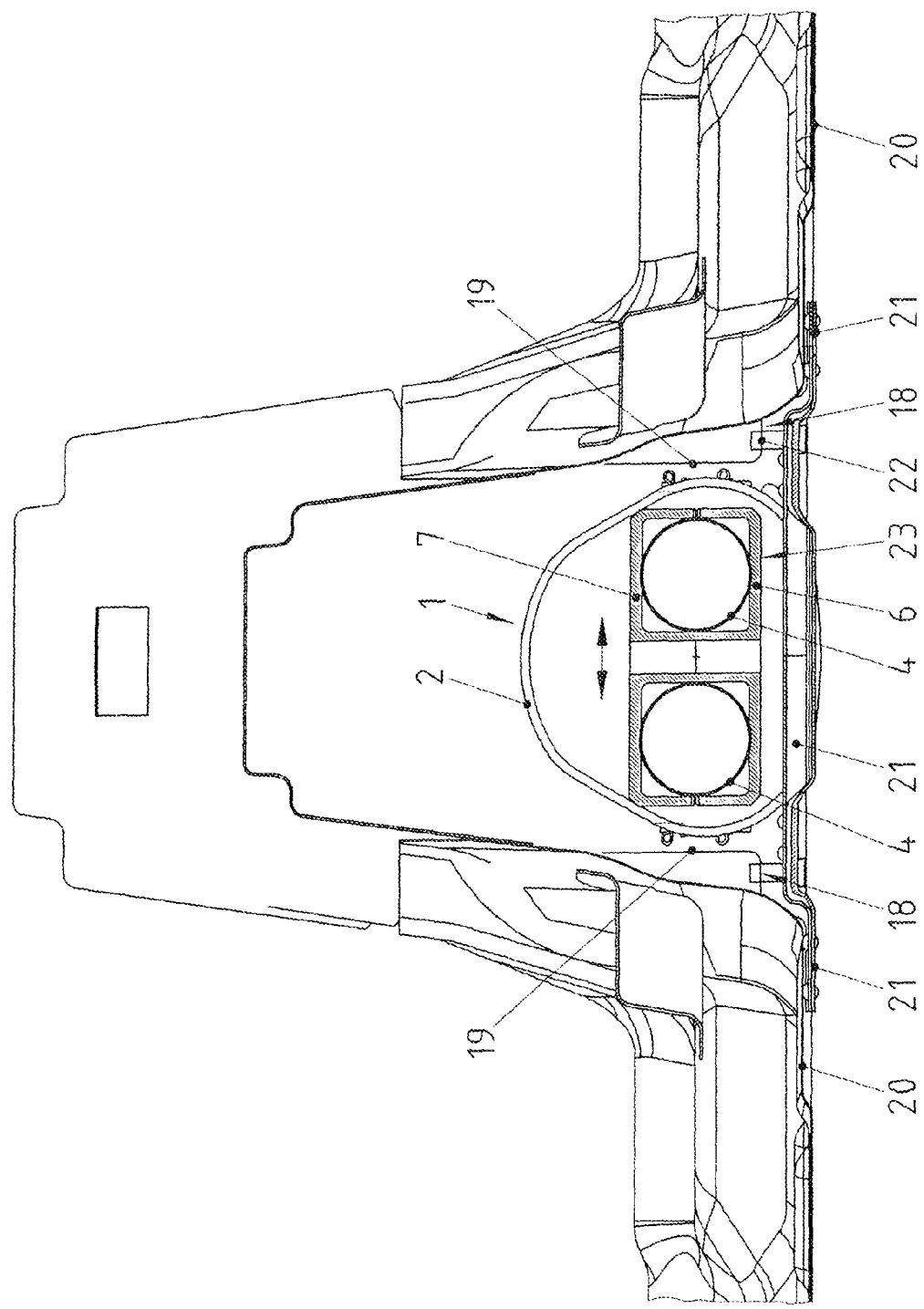
FIG. 5 is a diagrammatic, sectional view according to FIG. 4, the tunnel being additionally closed at a bottom by a tunnel bridge.

The modification according to the illustration in FIG. 5 shows that the tunnel 17 can additionally be covered at the bottom by a tunnel bridge 21 which is screwed to the vehicle floor 20.

The invention claimed is:

1. A crash support assembly for a motor vehicle having a tunnel region extending in a longitudinal direction, at least one exhaust tract guided through the tunnel region, the motor vehicle further having first and second seat cross members disposed on opposite sides of the tunnel region, the seat cross members being aligned with one another and extending in lateral directions transverse to the longitudinal direction, the crash support assembly comprising:
first and second supporting surfaces formed respectively on ends of the first and second seat cross members adjacent the tunnel region, said first and second supporting surfaces being parallel to one another, parallel to the longitudinal direction and perpendicular to the lateral directions; and
a crash support clamped directly around the exhaust tract, said crash support having opposite first and second sides being parallel to said first and second supporting surfaces and being aligned with and facing said first and second supporting surfaces formed on the seat cross members, said first and second sides of said crash support having widths exceeding a diameter of the exhaust tract, whereby an impact that introduces lateral forces sufficient to move the first seat cross member laterally urging said first supporting surface into said first side of said crash support and urging said second side of said crash support into said second supporting surface formed on the second seat cross member for contributing to dimensional stability of the motor vehicle.

2. The crash support assembly according to claim 1, wherein said crash support has two half shells for completely surrounding and accommodating the at least one exhaust tract between said two half shells.

3. The crash support assembly according to claim 1, wherein said crash support has a lower contour disposed approximately level with a lower contour of the seat cross member.

4. The crash support assembly according to claim 1, wherein the tunnel region is covered at a bottom by a tunnel bridge.

5. The crash support assembly according to claim 2, wherein said crash support has a dividing plane, said dividing plane is predetermined by said two half shells and is disposed parallel to a vehicle floor.

6. The crash support assembly according to claim 2, wherein said two half shells can be screwed together.

7. The crash support assembly according to claim 2, wherein said two half shells are of identical configuration.

8. The crash support assembly according to claim 2,
further comprising at least two mating elements; and
wherein said two half shells have, on mutually facing sides, recesses formed therein for receiving said at least two mating elements, respective ones of said mating elements engaging in ones of said recesses of one of said two half shells and in said recess which is adjacent to said recess, of said other of said half shells.

9. The crash support assembly according to claim 2, wherein said crash support and said two half shells serve to receive two exhaust pipes which form part of the exhaust tract.

10. The crash support assembly according to claim 2, wherein said crash support and said two half shells are disposed at a distance from the seat cross members.

11. The crash support assembly according to claim 2, wherein said two half shells have half shell blanks of identical configuration.

12. The crash support assembly according to claim 8,
wherein said mating elements are mating sleeves; and
further comprising screws serving to connect said two half shells passing through said mating sleeves.

13. The crash support assembly according to claim 9, wherein each of said two half shells has two receptacles formed therein for receiving the two exhaust pipes.

14. The crash support assembly according to claim 9, wherein said receptacles are semicircular in cross section.

15. A motor vehicle, comprising:
a tunnel extending in a longitudinal direction of the motor vehicle;
at least one exhaust tract guided through said tunnel and having a given diameter;
seat cross members including first and second seat cross members disposed on opposite sides of said tunnel, said seat cross members being aligned with one another and extending in lateral directions transverse to the longitudinal direction, said first and second seat cross members having first and second supporting surfaces formed respectively on ends of said first and second seat cross members adjacent said tunnel, said first and second supporting surfaces being parallel to one another, parallel to the longitudinal direction and perpendicular to the lateral directions; and
a crash support clamped directly around said exhaust tract, said crash support having opposite first and second sides being substantially parallel to said first and second supporting surfaces of said seat cross members and being aligned with and facing said first and second supporting surfaces of said seat cross members, said first and second sides of said crash support having widths exceeding said given diameter of said exhaust tract, whereby an impact that introduces lateral forces sufficient to move said first seat cross member laterally urging said first supporting surface into said first side of said crash support and urging said second side of said crash support into said second supporting surface of said second seat cross member for contributing to dimensional stability of the motor vehicle.

16. The motor vehicle according to claim 15, wherein said crash support has two half shells for completely surrounding and accommodating said at least one exhaust tract between said two half shells.

17. The motor vehicle according to claim 15, wherein said crash support has a lower contour disposed approximately level with a lower contour of said seat cross members.

18. The motor vehicle according to claim 16,
further comprising at least two mating elements; and
wherein said two half shells have, on mutually facing sides, recesses formed therein for receiving said at least two mating elements, respective ones of said mating elements engaging in ones of said recesses of one of said two half shells and in said recess which is adjacent to said recess, of said other of said half shells.

19. The motor vehicle according to claim 16, wherein said crash support and said two half shells are disposed at a distance from said seat cross members.

20. The motor vehicle according to claim 18,
wherein said mating elements are mating sleeves; and
further comprising screws serving to connect said two half shells passing through said mating sleeves.

* * * * *